(12) United States Patent
Schuttler et al.

(10) Patent No.: US 7,281,958 B2
(45) Date of Patent: Oct. 16, 2007

(54) POWER TERMINAL BLOCK

(75) Inventors: David Schuttler, W. Townsend, MA (US); John Stranberg, Boston, MA (US); Michael Falcinelli, Boxford, MA (US); Srdan Mutabdzija, Somerville, MA (US); James Edward Briggs, Nashua, NH (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 10/763,811

(22) Filed: Jan. 23, 2004

(65) Prior Publication Data

US 2005/0164563 A1    Jul. 28, 2005

(51) Int. Cl.
*H01R 9/22* (2006.01)
(52) U.S. Cl. .................................. 439/709; 430/660
(58) Field of Classification Search ............ 439/660, 439/682, 708, 709, 246, 247; 174/65 R
See application file for complete search history.

(56) References Cited

U.S. PATENT DOCUMENTS

| | | | |
|---|---|---|---|
| 3,007,129 A * | 10/1961 | Nielsen | ...... 439/692 |
| 4,595,248 A * | 6/1986 | Brown | ........ 439/83 |
| 5,227,262 A | 7/1993 | Ozer | |
| 5,319,571 A | 6/1994 | Langer et al. | |
| 5,349,282 A | 9/1994 | McClure | |
| 5,422,558 A | 6/1995 | Stewart | |
| 5,477,091 A | 12/1995 | Fiorina et al. | |
| 5,516,303 A | 5/1996 | Yohn et al. | |
| 5,610,368 A * | 3/1997 | Smith | ..... 174/35 GC |
| 5,663,525 A * | 9/1997 | Newman | ...... 174/50 |
| 5,901,057 A | 5/1999 | Brand et al. | |
| 5,982,652 A | 11/1999 | Simonelli et al. | |
| 6,121,695 A | 9/2000 | Loh | |
| 6,201,319 B1 | 3/2001 | Simonelli et al. | |
| 6,274,950 B1 | 8/2001 | Gottlieb et al. | |
| 6,310,783 B1 | 10/2001 | Winch et al. | |

(Continued)

FOREIGN PATENT DOCUMENTS

EP   0 340 952 A1   11/1989

(Continued)

OTHER PUBLICATIONS

Symmetra Brochure, "Server, Network and Telecom Power Soultions," pp. 1-20.

(Continued)

*Primary Examiner*—Khiem Nguyen
(74) *Attorney, Agent, or Firm*—Lowrie, Lando & Anastasi, LLP (57) ABSTRACT

A terminal block for use in an uninterruptible power supply comprises a first portion that includes a plurality of stalls, each of the plurality of stalls having an aperture, and at least one socket positioned in the aperture, the at least one socket arranged to accept a wire from internal portions of the uninterruptible power supply, and a second portion removably connectable to the first portion, the second portion including a plurality of stalls, a plurality of electrical ports, an electrical port positioned in each of the plurality of stalls, and at least one connector pin positioned within one of the plurality of stalls to connect to the at least one socket through the aperture.

17 Claims, 5 Drawing Sheets

U.S. PATENT DOCUMENTS

| | | |
|---|---|---|
| 6,400,043 B1 | 6/2002 | Batson et al. |
| 6,424,119 B1 | 7/2002 | Nelson et al. |
| 6,445,088 B1 | 9/2002 | Spitaels et al. |
| 6,489,561 B2 | 12/2002 | Ziegler et al. |
| 6,511,328 B2 * | 1/2003 | Molus et al. ............... 439/76.1 |
| 6,700,351 B2 | 3/2004 | Blair et al. |
| 6,773,285 B2 * | 8/2004 | Bernat et al. ............... 439/246 |
| 6,803,678 B2 | 10/2004 | Gottlieb et al. |
| 2002/0136042 A1 | 9/2002 | Layden et al. |
| 2005/0162019 A1 | 7/2005 | Masciarelli et al. |
| 2005/0162129 A1 | 7/2005 | Mutabdzija et al. |
| 2005/0162836 A1 | 7/2005 | Briggs et al. |

FOREIGN PATENT DOCUMENTS

| | | |
|---|---|---|
| EP | 0 574 628 A1 | 12/1993 |
| EP | 0 575 060 B1 | 9/1996 |

OTHER PUBLICATIONS

Patent Abstracts of Japan, vol. 1999, No. 9, Jul. 30, 1999 & JP 11 097092 A (Fujitsu Denso Ltd.), Apr. 9, 1999, 1 pg.

Patent Abstracts of Japan, vol. 1997, No. 12, Dec. 25, 1997 & JP 09 213423 A (Japan Aviation Electron Ind. Ltd.), Aug. 15, 1997, 1 pg.

Patent Abstracts of Japan, vol. 2003, No. 12, Dec. 5, 2003 & JP 2003 346940 A (NEC Commun Syst Ltd.), 1 pg.

International Search Report for PCT/US2005/001929 mailed Apr. 4, 2006.

* cited by examiner

FIGURE 2
MALE ASSEMBLY

FIGURE 3A

FEMALE (FIXED) SIDE

POWER TERMINAL BLOCK

FIELD OF THE INVENTION

Embodiments of the present invention are directed to an apparatus for use in electrical installation processes, and more specifically directed to the use of connectors in installing electrical hardware.

BACKGROUND OF THE INVENTION

Electronic systems, such as uninterruptible power supplies, generally include terminal blocks to facilitate connection between two groups of wires. It is common to use DIN terminal blocks with screw terminals that are fixed to the electronic system and whereby electrical connections are made. The terminal block is typically connected in a position that is space constrained. In such a space, multiple wire connections can be made, but the connections require manual intervention by a user or an electrician, who must clamp or punch down a wire to achieve connection. In larger systems, less flexible and larger gauge wire is required to complete electrical connections, which increases the difficulty for an electrician in connecting the wires, since the space in which the terminal block is positioned remains relatively small, despite the increase in wire size.

Further, it is often the case that setup of an electrical system requires use of clamping and wire routing tools to complete installation. Use of such tools in a confined space is necessary for proper connections, but difficult to manipulate by a user. It is therefore desirable to simplify wire connectivity in electronic devices.

SUMMARY OF THE INVENTION

The present invention relates to improved terminal block connectors in which the electrical installation process is simplified. A substantially modular design for a terminal bock allows ease in replacement and ease in connection or installation.

Embodiments of the invention provide a terminal block for use in an uninterruptible power supply. The terminal block includes a first portion comprising a plurality of stalls, each of the plurality of stalls having an aperture, and at least one socket positioned in the aperture, the at least one socket arranged to accept a wire from internal portions of the uninterruptible power supply. The terminal block also includes a second portion removably connectable to the first portion, the second portion comprising a plurality of stalls, a plurality of electrical ports, an electrical port positioned in each of the plurality of stalls, and at least one connector pin positioned within one of the plurality of stalls to connect to the at least one socket through the aperture.

Implementations of the invention may include one or more of the following feautures. At least one socket of the first portion can be float-connected to at least one of the plurality of stalls of the first portion. The at least one connector pin can be float-connected to the at least one of the plurality of stalls of the second portion. The first portion can be fixedly connected to the uninterruptible power supply. The plurality of stalls of the first portion and the plurality of stalls of the second portion can be insulated terminals. Each of the plurality of electrical ports can include a screw lug. Further, the second portion can be further comprised of a terminal block tray on which the stalls are positioned, an output ground connection connected to the terminal block tray, and a wire panel connected to the terminal block tray.

Embodiments of the invention further provide a terminal block for use in making electrical connections in an uninterruptible power supply. The terminal block includes a first portion having a plurality of stalls, each of the plurality of stalls including an aperture to accept a wire from an internal portion of the uninterruptible power supply, a second portion having a plurality of stalls, each of the plurality of stalls including an electrical port for accepting electrical connections from at least one device, and connecting means for connecting the first portion to the second portion, the connecting means including at least one connector inserted into a first side of the aperture and at least one socket inserted into a second side of the aperture.

Implementations of the invention may include one or more of the following features. The connecting means may include float-connecting means for movably connecting the at least one socket to one of the plurality of stalls of the first portion. The connecting means may further include shrouds for removably snap-fitting the at least one socket into the second side of the aperture. The connecting means can include float-connecting means for float connecting the at least one connector to one of the plurality of stalls of the second portion. The first portion can be fixedly connected to the uninterruptible power supply. The plurality of stalls of the first portion can be insulated terminals. The plurality of stalls of the second portion can be insulated terminals. The second portion can be further comprised of a terminal block tray on which the plurality of stalls are positioned, an output ground connection connected to the terminal block tray, and a wire panel connected to the terminal block tray.

The invention will be more fully understood after a review of the following figures, detailed description and claims.

BRIEF DESCRIPTION OF THE FIGURES

For a better understanding of the present invention, reference is made to the figures which are incorporated herein by reference and in which.

DETAILED DESCRIPTION OF THE INVENTION

Embodiments of the invention provide a terminal block input/output connector for use in electrical devices. Embodiments of the invention can be used in uninterruptible power supply systems for electrical connections internally and to external devices. Embodiments of the invention can be used in systems and electronic devices, other than uninterruptible power supplies, that require electrical connections. Still other applications of embodiments of the invention are envisioned.

Figure 1A:
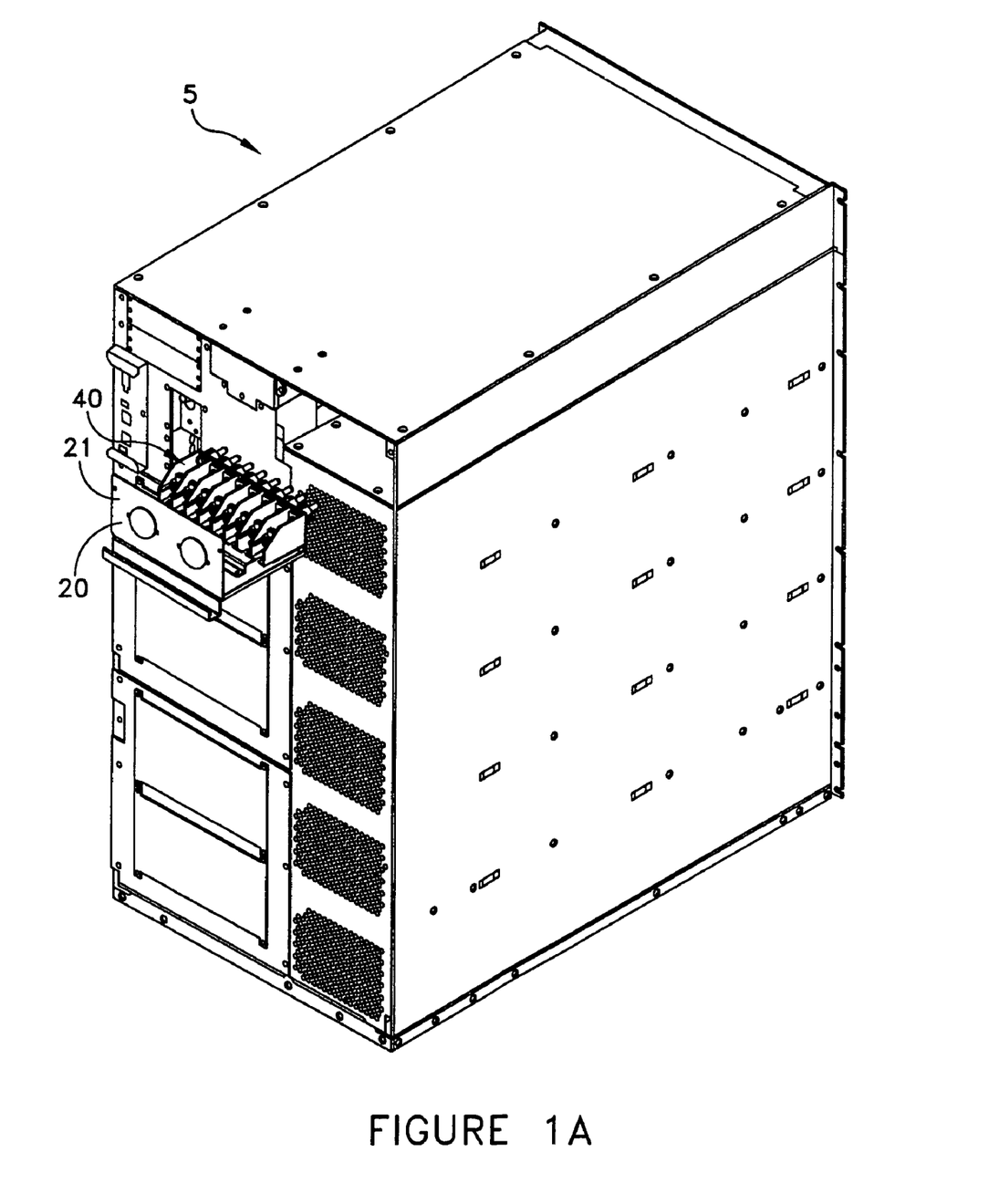
FIG. 1A is a perspective view of an uninterruptible power supply having a terminal block in accordance with one embodiment of the invention.

Referring to FIG. 1A, an uninterruptible power supply (UPS) is shown in a perspective view. The UPS can be a domestic or an international UPS model sold by American Power Conversion Corporation, the assignee of the present invention, such as the APC 16KVA UPS Tower Model, the APC 16KVA UPS Rack-mount model, or the APC 16KVA UPS Tower model with extended run battery, although other models of UPS systems are envisioned, including, but not limited to, additional APC models. A UPS 5 assists in providing a substantially consistent flow of power from a power source to electronic devices that are connected to the UPS. The UPS 5 includes a power terminal block, the male portion 40 of which is shown in FIG. 1A. The terminal block is comprised of a plurality of terminals that provide electrical connections for peripheral electrical devices, while keeping wires of such devices sufficiently separated. For example, peripheral electrical devices can include, but are not limited to, HVAC devices, refrigeration devices, control panels and motor controls. Wires from peripheral devices are connected to the terminal block, which then provides a completed electrical connection with the UPS 5, via internal wires connected to an internal side of the terminal block. Devices connected to the UPS 5 via the terminal block may be removed or replaced, requiring a user to access the terminal block and disconnect some wires and connect other wires. The space in which a user makes the connections to the terminal block is oftentimes very limited, due to the position of the terminal block in the UPS 5 or other electronic system. Thus, a system having a removable terminal block, as described below, greatly increases the ease with which connections can be made to the terminal block.

Figure 1B:
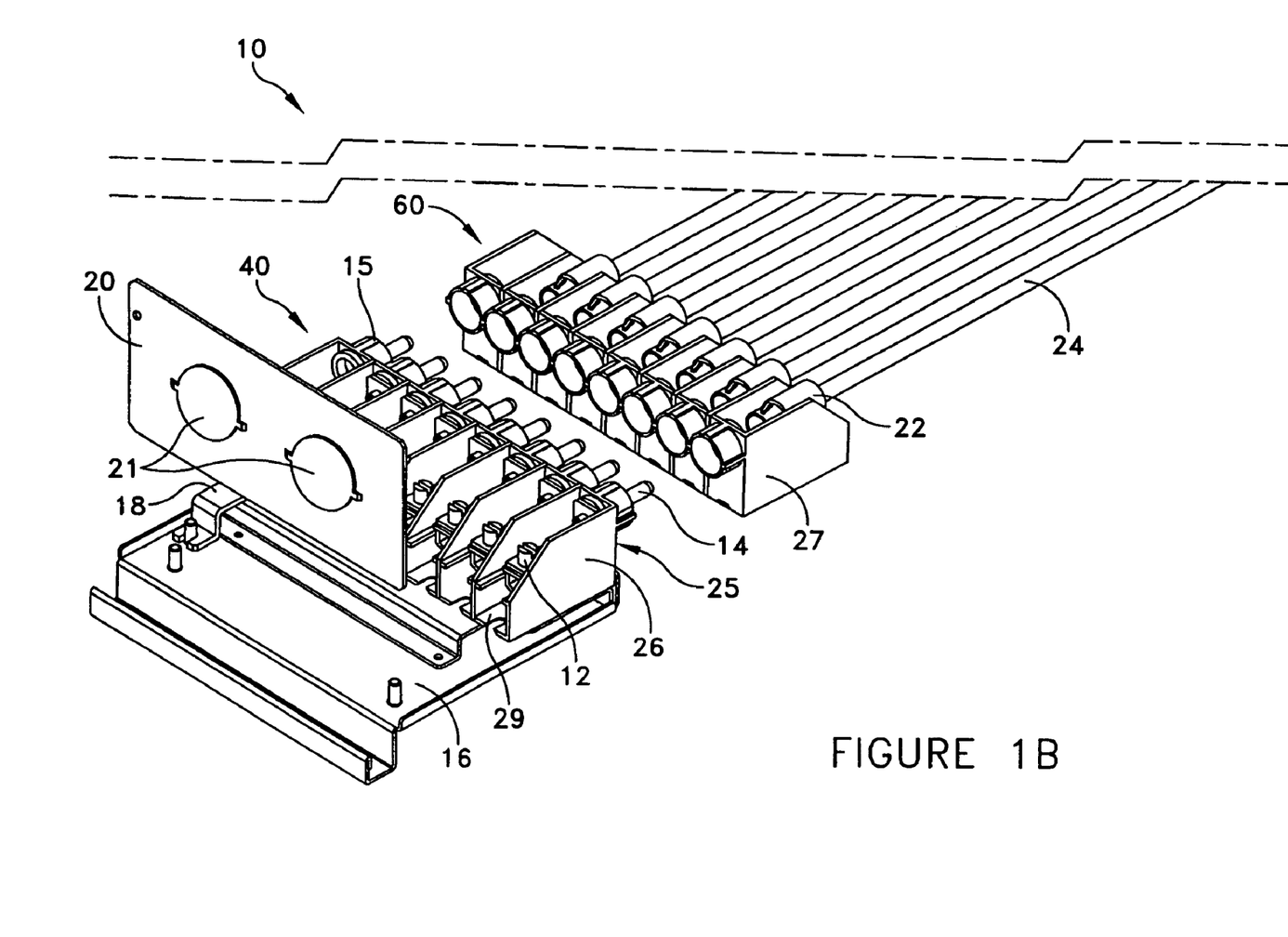
FIG. 1B is an exploded assembly view of a terminal block in accordance with one embodiment of the invention.
Figure 2:
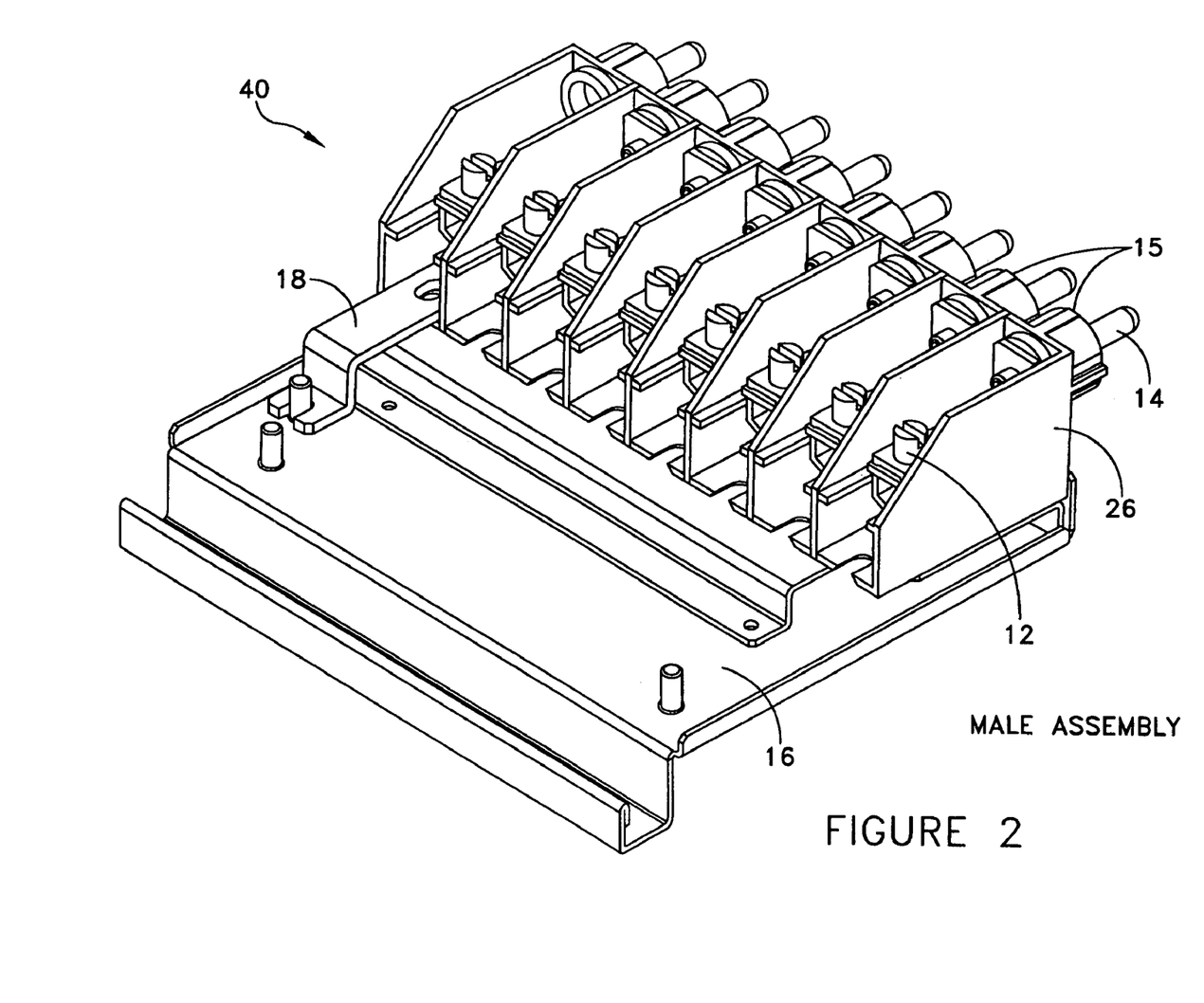
FIG. 2 is a perspective view of a portion of the terminal block in accordance with one embodiment of the invention.

Referring to FIG. 1B, a terminal block connector system 10 that can be used in a UPS is shown in an exploded assembly view. The connector system 10 includes a male portion 40 and a female portion 60 that mate to form the complete terminal block. Referring to FIGS. 1B and 2, the male portion 40 includes electrical ports, or mechanical wire screw lugs 12, male pins 14, a terminal block tray 16, an output wiring ground connection 18, a wire panel 20, and isolator/insulator blocks 26. The isolator/insulator blocks 26 have a front side 25 and a backside 29. The isolator/insulator blocks 26 are positioned in a row. A male pin 14 is located in each isolator block 26, substantially separating each pin 14 from other pins positioned in the row. The male pins 14 extend horizontally outward from the front side 25 of the male portion 40, which is the side that is inserted to connect with the female portion 60. The mechanical wire screw lugs 12, or other electrical ports, are located adjacent to the male pins 14. A mechanical screw lug 12 is positioned with each of the male pins 14. For example, a mechanical screw lug 12 can be positioned in an isolator block 26 in a location behind the male pin 14 to which the lug corresponds. External wires contact the wire screw lugs 12. The external wires can be crimped, screwed, or otherwise fastened into a contacting position with the lugs 12. For connection with external wires to be accomplished, the lugs 12 are substantially exposed when positioned in the isolator blocks 26.

Each of the isolator blocks 26 in which a male pin and a wire screw lug are positioned is mounted onto the terminal block tray 16. Thus, the terminal block tray 16 can be comprised of a plurality of isolator blocks 26. For example, eight isolator blocks 26 can be mounted on the terminal block tray 16. Also mounted on the terminal block tray 16 is an output ground wiring connection 18, which can be associated with and extend from the location of one of the isolator/insulator blocks 26. The wire panel 20 attaches to the terminal block tray 16 creating a wall on a backside of the terminal block 10. The wire panel 20 can be removably attached to the terminal block tray 16. The wire panel 20 can further include one, two, or more apertures 21 through which external wires are inserted for connection to the screw lugs 12. The wire panel 20 is screwed or otherwise attached to the UPS to enclose the terminal block inside the UPS.

To connect a wire to the screw lugs 12, an electrician or other user inputs a wire into an individual isolator block 26 and screws down the wire, or otherwise clamps it in a contacting position with the lug 12. For example, a terminal block 10 having eight terminals, or isolator blocks, can receive eight wires, one wire being connected in each block.

Each of the male pins 14 is independently float-connected to a respective isolator block 26. The male pin 14 is float-connected such that it is free to move radially, while remaining affixed to the respective isolator block 26. Radial movement is accomplished by mounting the male pins 14 to a cylindrical member 15. For example, the cylindrical member 15 can be a plastic ring member coupled to the insulator block 26. The cylindrical member 15 accepts the male pin 14 and retains it substantially loosely. Loose retention by the cylindrical member allows the male pin 14 to adjust to the position of the socket into which it is inserted. Because each male pin 14 moves independently, connections for each male pin are completed upon insertion of the male portion 40 of the terminal block into the female portion 60 of the terminal block, which is discussed in detail below. For example, if the male pins 14 are not aligned with the sockets, the floating ability compensates for the misalignment so that connection will still occur.

Figure 3A:
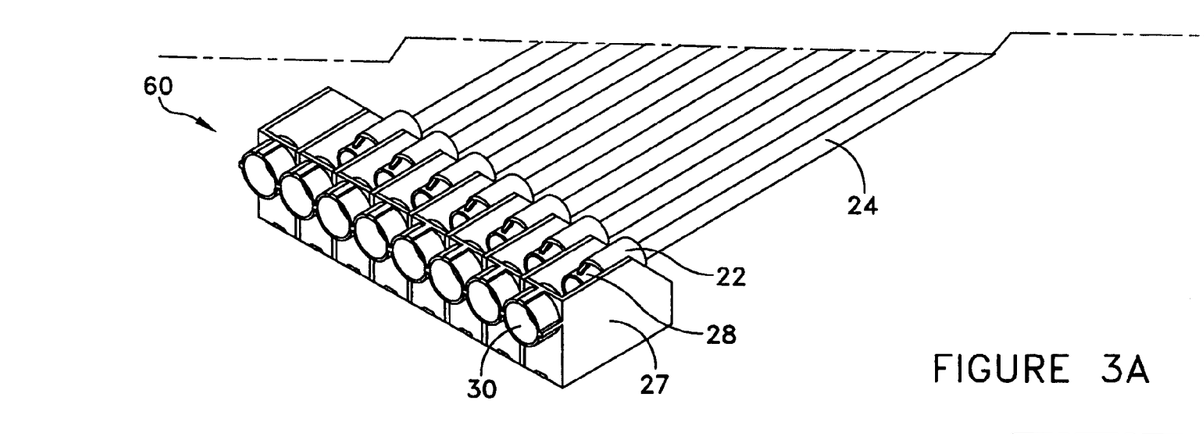
FIGS. 3A and 3B represent a perspective view of another portion of the terminal block in accordance with one embodiment of the invention.
Figure 3B:
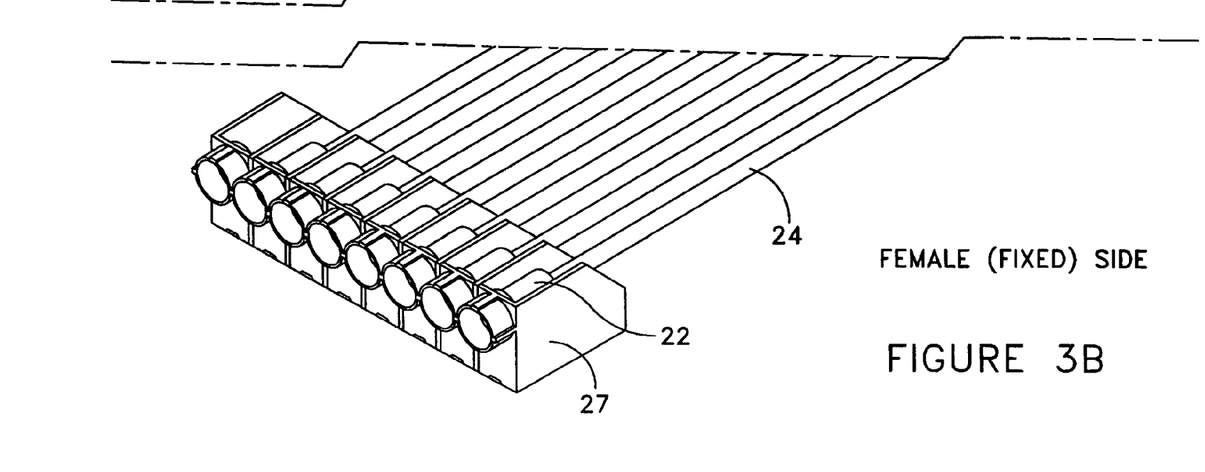

With continued reference to FIG. 1B, and with reference to FIGS. 3A and 3B, the female portion 60 of the connector system 10 is discussed. The female portion 60 is a portion internal to the UPS and substantially fixed in position. The female portion 60 includes female sockets 22 having snap-in shrouds 28, wire 24, and isolator/insulator blocks 27. Each insulator block 27 includes an aperture 30. The insulator blocks 27 are fixed in position within the UPS, or other electronic device. The insulator blocks can be fixed in position using any of a number of known methods of connection, including but not limited to screws or adhesives, such as tape or epoxy.

A wire 24 is crimped to each of the female sockets 22. The wire can be, for example, 4AWG wire having an end that is crimped to the female sockets 22. The wire is also connected internally within the UPS system to electrical components or subsystems requiring power. The snap-in shrouds 28 accept the wire 24. The snap-in shrouds also assist in connecting the sockets 22 into the apertures 30 in respective isolator/insulator blocks 27. The snap-in shrouds 28 allow snapping connection between the female sockets 22 and individual apertures 30 in the isolator blocks 27.

Although the socket 22 connects with the aperture 30 into which it is inserted, the socket 22 is individually float-connected in the aperture 30. The socket is permitted radial motion within the aperture 30 such that the socket may adjust in position to more easily connect with a male pin 14. A slot on the aperture accepts a snap or tab on the snap-in shroud 28. After snapping into place, the female socket 28 may rotate along the central axis 360 degrees, as it is free to move in the radial direction. The snap and the slot allow the socket to move radially, while inhibiting the socket 22 from being pushed or pulled out of the isolator block 27. Independent motion of each of the sockets 22 within its respective isolator block 27 increases the ease with which a connection is made between the sockets 22 and the pins 14, since each of the sockets and pins can adjust to the position required for insertion, even if the adjacent socket or pin does not require adjustment. The allowed radial movement is relatively small, i.e., the movement is not so loose such that uniting the pin and the socket is made more difficult. The snap-in shroud can be made of plastic, although other materials are acceptable.

The female sockets 22 accept the male pins 14 for electrical connection, and thus, the female sockets 22 are arranged in the insulator blocks 27 to correspond to the male pins 14. The female sockets can be arranged in any configuration having any number of sockets 22 that corresponds to the male pins. For example, the female sockets 22 can be arranged in a row having eight sockets in eight respective isolator blocks 27 that correspond to a row of eight male pins 14 in eight respective isolator blocks 26.

The female sockets 22 having wires 24 connected thereto connect into one side of the isolator blocks 27, while the male pins 14 are inserted for connection into the apertures 30 of the other side of the isolator blocks 27. Electrical connection between the male pins 14 and the female sockets 22 is completed within the apertures 30. Furthermore, electrical connection is accomplished easily, as the male portion 40 need simply be pushed into snapping connection with the female portion 60 for the terminal block to be in working connection.

Figure 4:
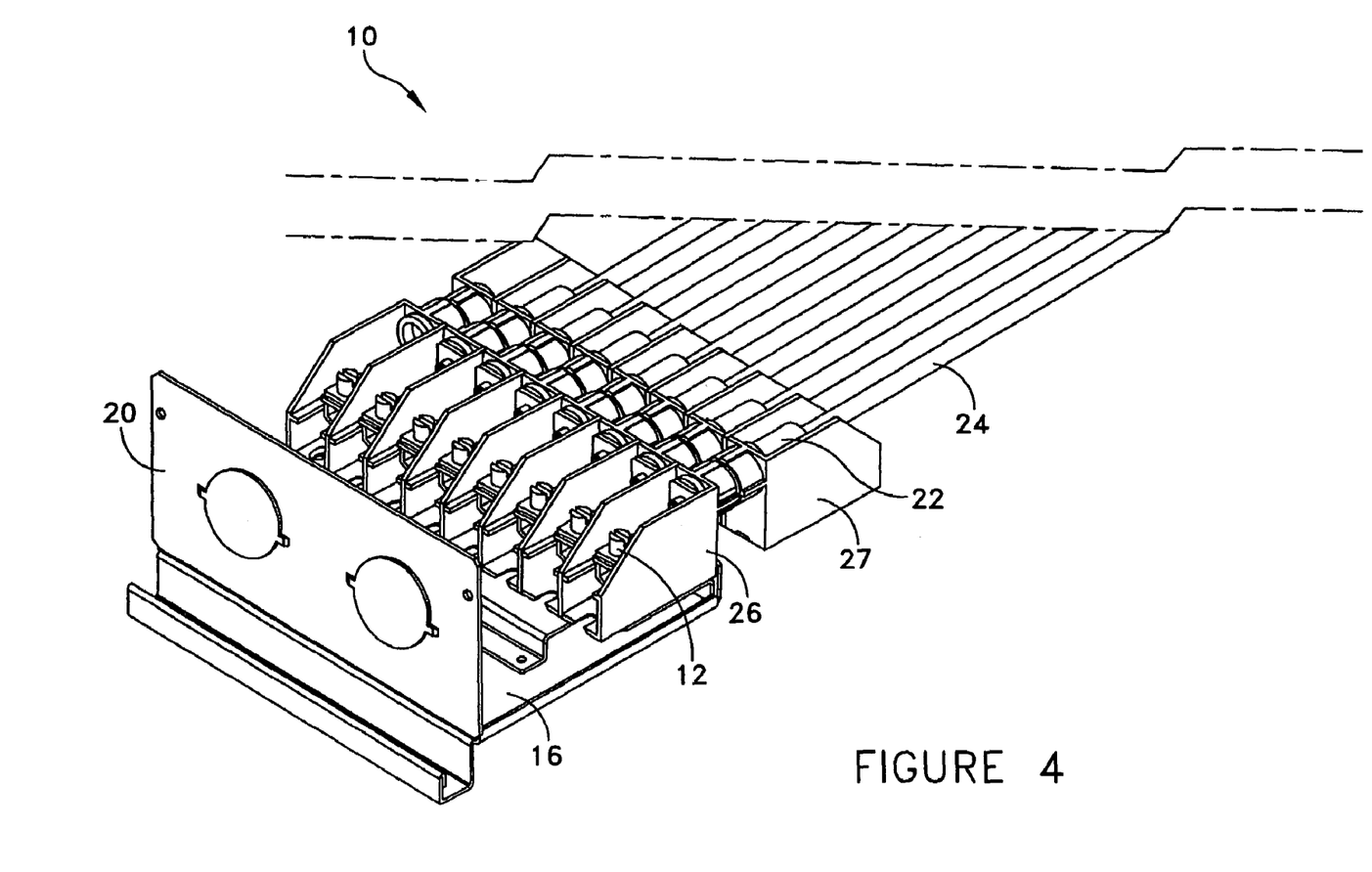
FIG. 4 is a mated perspective of the terminal block in accordance with one embodiment of the invention.

Referring to FIGS. 1A and 4, connection of the male portion of the terminal block to the female portion of the terminal block is described. The male portion 40 is completely removable from the UPS into which it is inserted for use. An electrician or other user having need to connect external wiring to the terminal block 10 can do so by unscrewing the wire panel 20 from the UPS. The male portion 40 is connected to the wire panel 20. As the wire panel 20 is removed, so is the male portion 40 of the terminal block 10. There is no need to manually manipulate the connection between the male pin 14 and the female socket 22, as removal of the male portion 14 is accomplished upon removal of the wire panel, and the pins simply unsnap from a mating position. External wires are thereafter easily connected to the screw lugs 12. Complete removal of the male portion 14 provides sufficient space for attachment or disconnection of wires when necessary.

With continued reference to FIG. 4, upon completion of attachment or disconnection of external wires to the terminal block 10, the male portion 14 of the terminal block 10 is reinserted into the UPS for electrical connection. To establish connection, the wire panel 20 is replaced and reconnected to the UPS chassis. The male pins 14 insert into the female sockets 22 simply by the attachment of the wire panel. Snapping the pins into the sockets 22 is further simplified by the floating connection of both the pins to the isolator blocks 26 and the sockets to the isolator blocks 27. When pressure is placed on the wire panel 20, and therefore the male portion 40, the pins 14 and the sockets 22 reposition themselves independently, if necessary, until each of the pins is in a locked position within its respective socket. Manual manipulation is not required but for the attachment of the wire panel to the UPS, which can be screwed into place via the user. The male portion 40 and the female portion 60 connect to one another in a mating position of the connector, shown external to the UPS in FIG. 4.

A terminal block has been described that provides ease of connectivity in an uninterruptible power supply. Embodiments of the invention provide a terminal block having a single row of eight male pins to correspond to a single row of eight female sockets. As will be apparent to those skilled in the art, other embodiments of the invention can include multiple rows of pins to correspond to multiple rows of sockets, and each row can have any number of pins and sockets. For example, a four position terminal block is possible and envisioned. Further embodiments do not include aligned rows of pins and sockets, but may have alternate configurations and positions of pins to correspond to a mirror configuration of sockets. Still other embodiments may include a number of pins and sockets, all of which need not be used at all times. Further embodiments of the invention employ a terminal block having automatic connectivity features used in an electronic system other than an uninterruptible power supply, such as a phone, computer, or other device. Additionally, any of a number of known wire sizes, shapes, and thickness can be effectively connected using the power terminal block herein described.

Embodiments of the invention are preferably used for a 100 ampere input/output pluggable terminal block. Other embodiments can be used for 20, 40, 80 ampere blocks, or for systems requiring greater than 100 A.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A terminal block for use in an uninterruptible power supply comprising:
   a first portion comprising:
      a plurality of stalls, each of the plurality of stalls having an aperture; and
      a plurality of sockets, with at least one socket positioned in each aperture, the at least one socket arranged to accept a wire from internal portions of the uninterruptible power supply;
   a second portion removably connectable to the first portion, the second portion comprising:
      a plurality of stalls;
      a plurality of electrical ports, an electrical port positioned in each of the plurality of stalls; and
      at least one connector pin positioned within one of the plurality of stalls to connect to one socket through one aperture.

2. The terminal block of claim 1 wherein at least one of the plurality of sockets of the first portion is float-connected to at least one of the plurality of stalls of the first portion.

3. The terminal block of claim 1 wherein the at least one connector pin is float-connected to the one of the plurality of stalls of the second portion.

4. The terminal block of claim 1 wherein the first portion is fixedly connected to the uninterruptible power supply.

5. The terminal block of claim 1 wherein the plurality of stalls of the first portion and the plurality of stalls of the second portion are insulated terminals.

6. The terminal block of claim 1 wherein each of the plurality of electrical ports includes a screw lug.

7. A terminal block for use in an uninterruptible power supply comprising:
   a first portion comprising:
   a plurality of stalls, each of the plurality of stalls having an aperture; and
   at least one socket positioned in the aperture, the at least one socket arranged to accept a wire from internal portions of the uninterruptible power supply; and
   a second portion removably connectable to the first portion, the second portion comprising:
   a plurality of stalls;

a plurality of electrical ports, an electrical port positioned in each of the plurality of stalls;

at least one connector pin positioned within one of the plurality of stalls to connect to the at least one socket through the aperture;

a terminal block tray on which the stalls are positioned;

an output ground connection connected to the terminal block tray; and a wire panel connected to the terminal block tray.

8. A terminal block for use in making electrical connections in an uninterruptible power supply comprising:

a first portion having a plurality of stalls, each of the plurality of stalls including an aperture to accept a wire from an internal portion of the uninterruptible power supply;

a second portion having a plurality of stalls, each of the plurality of stalls including an electrical port for accepting electrical connections from at least one device; and connecting means for connecting the first portion to the second portion, the connecting means including at least one connector inserted into a first side of the aperture and at least one socket inserted into a second side of the aperture.

9. The terminal block of claim 8 wherein the connecting means includes float-connecting means for movably connecting the at least one socket to one of the plurality of stalls of the first portion.

10. The terminal block of claim 8 wherein the connecting means includes shrouds for removably snap-fining the at least one socket into the second side of the aperture.

11. The terminal block of claim 8 wherein the connecting means includes float-connecting means for float connecting the at least one connector to one of the plurality of stalls of the second portion.

12. The terminal block of claim 8 wherein the first portion is fixedly connected to the uninterruptible power supply.

13. The terminal block of claim 8 wherein the plurality of stalls of the first portion are insulated terminals.

14. The terminal block of claim 8 wherein the plurality of stalls of the second portion are insulated terminals.

15. A terminal block for use in making electrical connections in an uninterruptible power supply comprising:

a first portion having a plurality of stalls, each of the plurality of stalls including an aperture to accept a wire from an internal portion of the uninterruptible power supply; and a second portion having a plurality of stalls, each of the plurality of stalls including an electrical port for accepting electrical connections from at least one device;

connecting means for connecting the first portion to the second portion, the connecting means including at least one connector inserted into a first side of the aperture and at least one socket inserted into a second side of the aperture;

a terminal block tray on which the plurality of stalls are positioned;

an output ground connection connected to the terminal block tray; and a wire panel connected to the terminal block tray.

16. The terminal block of claim 1 wherein each of the plurality of sockets of the first portion is float-connected to one of the plurality of stalls of the first portion, and wherein the at least one connector pin is float-connected to one of the plurality of stalls of the second portion.

17. The terminal block of claim 8 wherein the connecting means includes float-connecting means for movably connecting the at least one socket to one of the plurality of stalls of the first portion, and wherein the connecting means includes float-connecting means for float connecting the at least one connector to one of the plurality of stalls of the second portion.

* * * * *